(12) United States Patent
Lagerweij et al.

(10) Patent No.: US 6,354,553 B1
(45) Date of Patent: Mar. 12, 2002

(54) SEAT TRACK ASSEMBLY WITH POSITIVE LOCK MECHANISM

(75) Inventors: Richard Allen Lagerweij, Thornton; Pascal Garrido, Kilworthy, both of (CA)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 09/516,346

(22) Filed: Mar. 1, 2000

(51) Int. Cl.[7] ............................................. F16M 13/00
(52) U.S. Cl. ..................... 248/430; 248/429; 297/344.1
(58) Field of Search ................................. 248/424, 429, 248/430; 297/344.11, 344.1

(56) References Cited

U.S. PATENT DOCUMENTS

| | | | |
|---|---|---|---|
| 4,909,469 A | * 3/1990 | Nihei et al. ................. | 248/429 |
| 5,028,028 A | * 7/1991 | Yamada et al. ............. | 248/430 |
| 5,286,076 A | * 2/1994 | DeVoss et al. .............. | 248/429 |
| 5,358,207 A | * 10/1994 | West ........................... | 248/430 |
| 5,564,315 A | * 10/1996 | Schuler et al. .............. | 248/424 |
| 5,676,341 A | * 10/1997 | Tarusawa et al. ........... | 248/430 |
| 5,855,350 A | 1/1999 | Volker et al. | |
| 5,893,545 A | 4/1999 | Lyons et al. | |
| 5,899,532 A | 5/1999 | Paisley et al. | |
| 5,918,846 A | 7/1999 | Garrido | |
| 5,944,383 A | 8/1999 | Mathey et al. | |
| 5,957,535 A | 9/1999 | Pasternak et al. | |
| 6,007,039 A | 12/1999 | Olsson et al. | |
| 6,010,190 A | 1/2000 | Downey | |
| 6,021,990 A | 2/2000 | Freund | |

\* cited by examiner

*Primary Examiner*—Ramon O. Ramirez
*Assistant Examiner*—Korie H. Chan
(74) *Attorney, Agent, or Firm*—C. R. Kiczek

(57) ABSTRACT

A seat track assembly for an adjustable seat with positive engagement is disclosed and has a lower track assembly with at least one lower track having a plurality of spaced slots and an upper track assembly with at least one lower track. The upper track is slidable over the lower track. A latch is movable from a latching position securing the upper track with respect to the lower track to an unlatching position where the upper track is free to slide over the lower track. The latch comprises a plurality of locking pawls mounted on the upper track, with each locking pawl having a first tooth and a second tooth and each tooth has a front face and a rear face. In the latching position the first tooth of a first one of the locking pawls is received within a first slot and the second tooth of the first one of the locking pawls is received within a second slot. In accordance with certain preferred embodiments the width of each slot is twice the slot width, the pawls are separated from one another by a distance equivalent to the width of each tooth, the slots are separated by a distance generally equal to the width of each tooth.

20 Claims, 7 Drawing Sheets

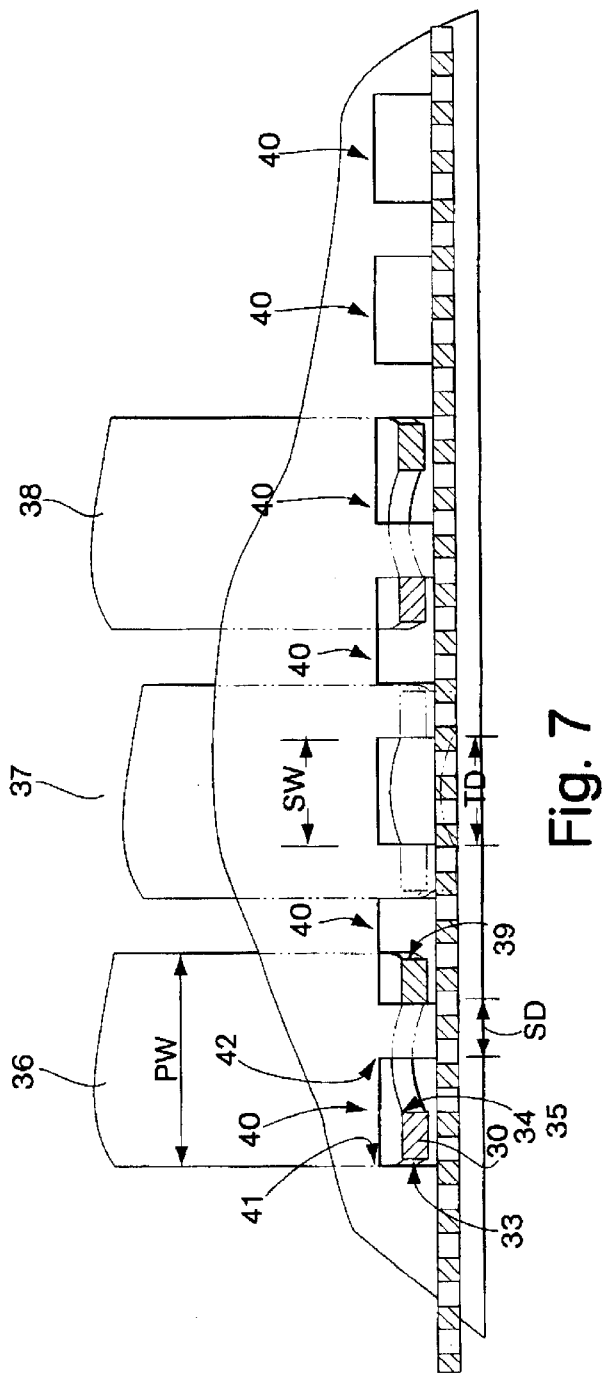
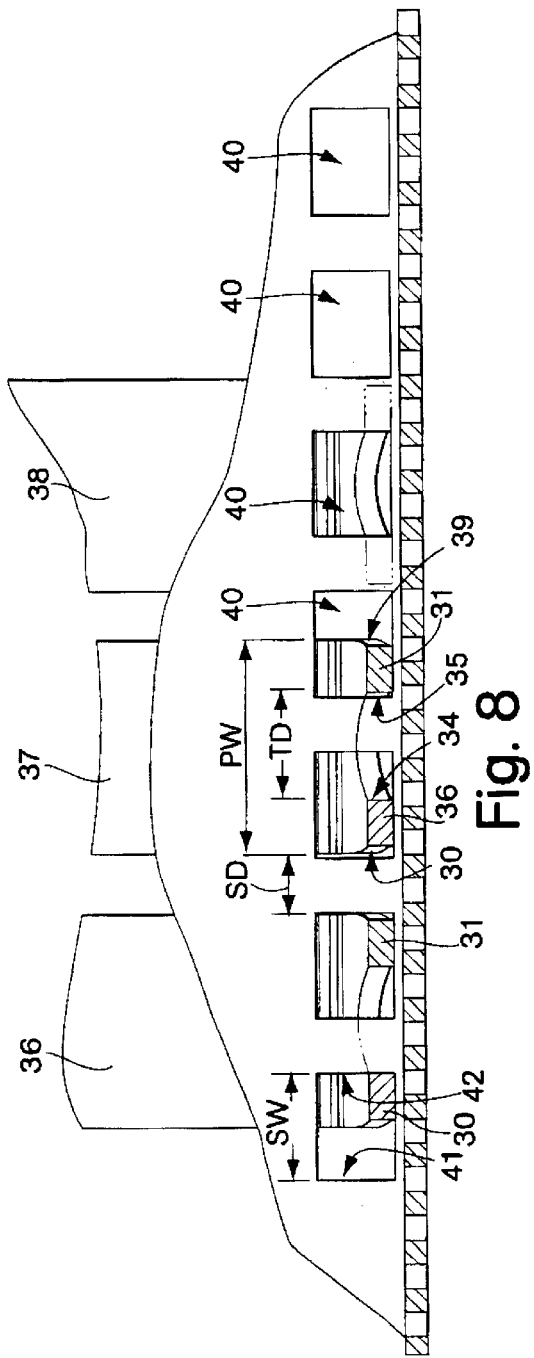

SEAT TRACK ASSEMBLY WITH POSITIVE LOCK MECHANISM

FIELD OF THE INVENTION

The present invention is directed to seat track assemblies for motor vehicles, and more particularly to improvements in lock mechanisms for holding the seat track assembly in a fixed position.

BACKGROUND OF THE INVENTION

Seat track assemblies have been used to move a seat, typically in at least forward and rearward directions in a motor vehicle. Such known seat track assemblies have a lower track assembly comprising a pair of spaced, parallel lower tracks and an upper track assembly comprising a pair of spaced, parallel upper tracks, with each upper track slidable over a corresponding lower track. A lock or latch mechanism is provided to secure the upper track with respect to the lower track. Such a latch can be, for example, a latch with windows mounted on one track which engage teeth on the other track, or a latch with a tooth mounted on one track which engages a slot in the other track. Typically a handle, often referred to as a towel bar, is used to operate the latch between a latching position and an unlatching position. It is desirable for such a lock or latch mechanism to provide continuous or positive engagement wherein if the towel bar is released, the latch automatically moves back to the latching position and the upper tracks are secured to the lower tracks.

One such example of positive engagement is found in U.S. Pat. No. 5,918,846 to Pascal Garrido, a co-inventor of the present invention. The latch of a seat track assembly is mounted on an upper track and is seen to have three locking pawls. Spring biased locking pawls are designed to engage slots in a lower track when the latch is in the latching position. The size of the pawls and slots and the relative position of each pawl with respect to the slots has been designed so that at least one of the pawls engages a slot (and thereby secures the upper track with respect to the lower track) no matter what the position of the upper track on the lower track.

There is a need for a seat track assembly having a latch capable on ensuring positive engagement between the upper and lower tracks and capable of withstanding the ever-increasing load requirements placed upon the seat. High loading on the seat tracks may be seen in all-belts-to-seat ("ABTS") applications, where seat belts and shoulder belts are attached directly to the seat instead of to the side and/or the floor of the motor vehicle.

In view of the foregoing, it is an object of the present invention to provide a seat track assembly which is of simple construction and low cost, and which has positive engagement of a locking device with the ability to endure high loading. It is an additional object of the present invention to provide a seat track assembly that is highly reliable in operation and which can be manufactured efficiently. Additional objects and optional features of the invention will be apparent form the following disclosure and detailed discussion of preferred embodiments.

SUMMARY OF THE INVENTION

In accordance with a first aspect, a seat track assembly comprises a lower track assembly having a lower track with a plurality of spaced slots, with each slot having a front wall and a rear wall, an upper track assembly operably engaging the lower track assembly and comprising an upper track slidable over the lower track, and a latch movable from a latching position securing the upper track with respect to the lower track to an unlatching position where the upper track is free to slide over the lower track. The latch comprises a plurality of locking pawls mounted on the upper track, with each locking pawl having first and second teeth with each tooth having a front face and a rear face. In the latching position the first tooth of the first locking pawl is received within a first slot and the second tooth of the first locking pawl is received within a second slot. An actuation fork mounted on the upper track guides the plurality of pawls into and out of engagement with the lower tracks.

In accordance with another aspect, the slots on the lower track are spaced apart by a slot distance and the first tooth of each pawl is spaced apart from the second tooth of the corresponding pawl by a tooth distance generally equivalent to the slot distance.

In accordance with another aspect, the slots on the lower track have a slot width, and each pawl has a pawl width which is generally twice the slot width.

From the foregoing disclosure and the following more detailed description of various preferred embodiments, it will be apparent to those skilled in the art that the present invention provides a significant advance in the technology and art of seat track assemblies. Particularly significant in this regard is the potential the invention affords for providing positive locking between the upper track and the lower track of a motor vehicle and satisfying high strength requirements. Additional features and advantages of various preferred embodiments will be better understood in view of the detailed description provided below.

BRIEF DESCRIPTION OF THE DRAWINGS

FIG. 7 is a partial cross section view of a preferred interaction between the teeth of the latch and the slots in the lower track.

FIG. 8 is a partial cross section view as in FIG. 7 and shows another position for the teeth of the track.

Figure 1:
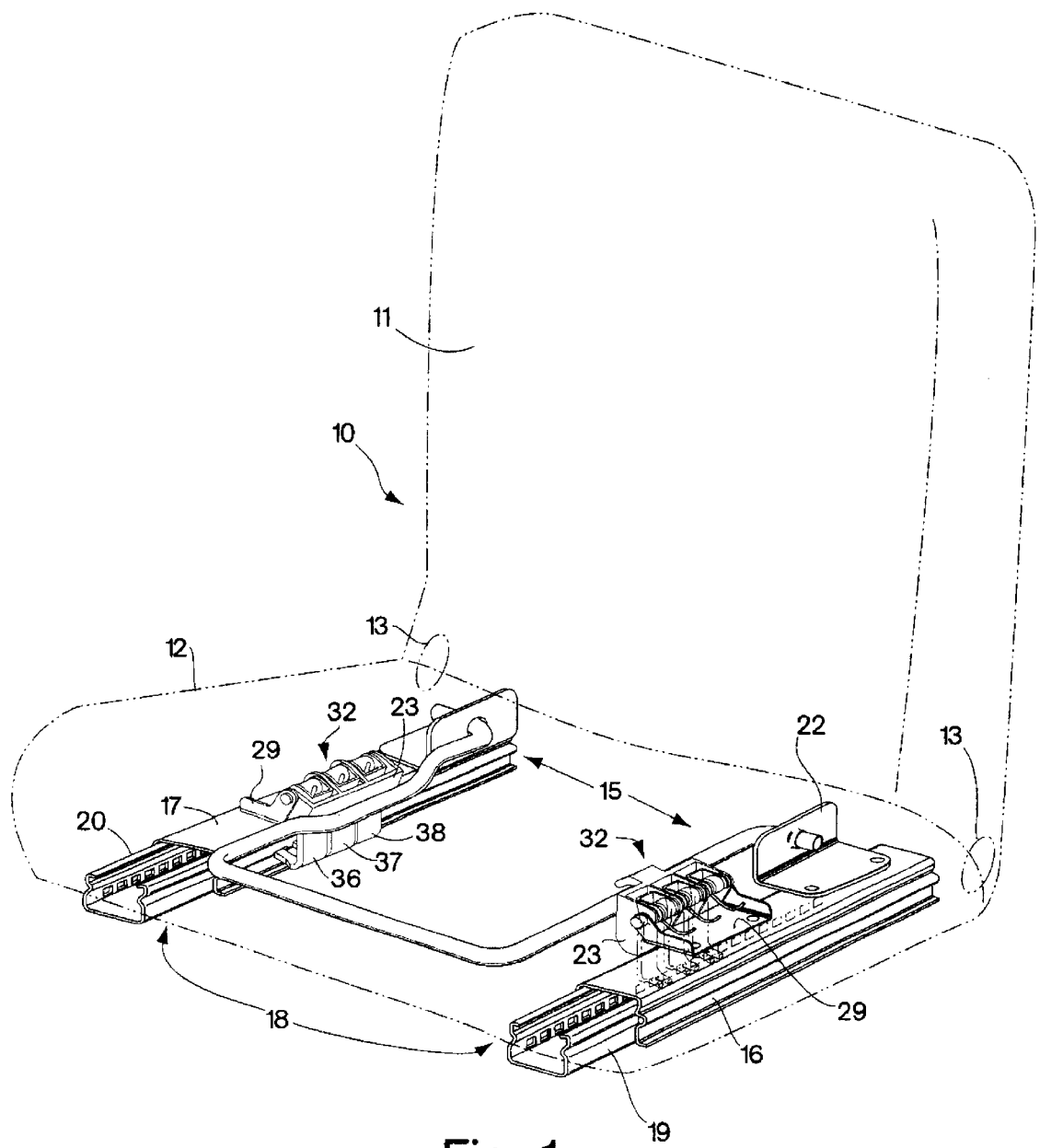
FIG. 1 is a perspective view of a preferred embodiment of a seat having a seat track assembly in accordance with a perferred embodiment.

It should be understood that the appended drawings are not necessarily to scale, presenting a somewhat simplified representation of various preferred features illustrative of the basic principles of the invention. The specific design features of the seat track assembly as disclosed here, including, for example, specific dimensions of the pawl and the actuation fork will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the seat track assembly illustrated in the drawings. In general, up or upward refers to the top of the paper in FIG. 1 and down or downward refers to a direction towards the bottom of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the seat track assemblies disclosed here. The following detailed discussion of various alternative and preferred features and embodiments will illustrate the general principles of the invention with reference to a seat track assembly of a motor vehicle capable of two-way motion. Other embodiments suitable for other applications, including four-way, six way and memory embodiments, will be apparent to those skilled in the art given the benefit of this disclosure.

Turning now to the drawings, FIG. 1 shows a perspective view of a seat 10 having a seat base 12 and a seat back pivotably mounted to the seat base on a seat hinge 13. An upper track assembly 15 comprises upper tracks 16, 17 which are slidable over corresponding lower tracks, 19, 20 formed as part of a lower track assembly 18 for comfort adjustment of the seat base 12. A seat track mount or riser is commonly provided to raise the seat 10 off of the floor of the motor vehicle and to align the seat an ergonomically acceptable angle. The seat track mount may be part of the upper track assembly, part of the lower track assembly, or part of both. The tracks are secured to one another via latches 32.

Figure 2:
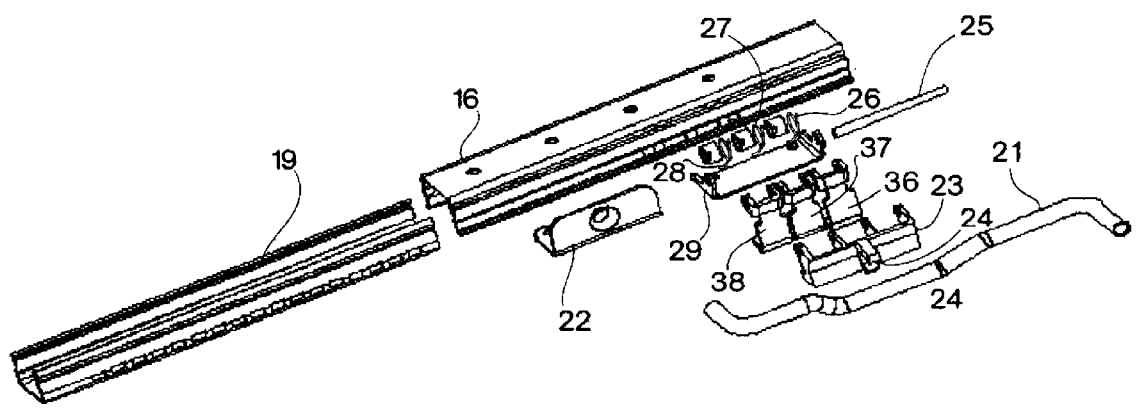
FIG. 2 is an exploded perspective view of the seat track assembly of FIG. 1.

FIG. 2 shows the components of the latch 32 in an exploded assembly view. Latches 32 are connected together by a release member or towel bar 21, pivotably mounted on towel bar mounting brackets 22 affixed to the upper track assembly 15. Latches 32 are essentially mirror images of one another, one for each set of upper and lower tracks. Since the latches are essentially mirror images of one another, additional discussion will focus on one latch with the understanding that the other latch operates in substantially the same manner. It will be readily apparent to those skilled in the art, given the benefit of this disclosure, that the positive engagement latch 32 shown here may be used on only one set of upper and lower tracks, and that a conventional latch could be used on the other set of upper and lower tracks.

Figure 3:
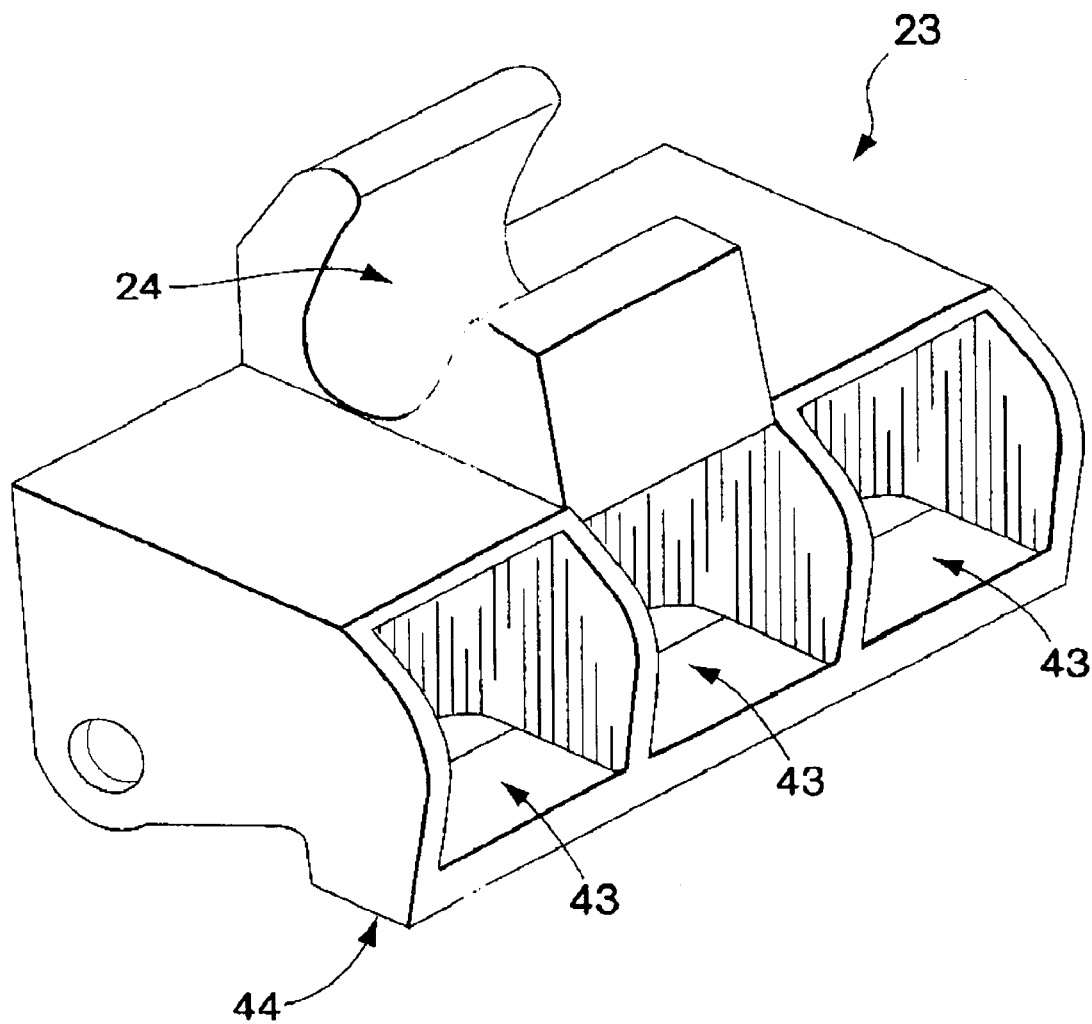
FIG. 3 is an isolated perspective view of the actuation fork shown in FIG. 2.

An actuation fork 23 is mounted on a lock bracket 29 affixed to the upper track 16. The lock bracket 29 and actuation fork 23 cooperate to receive a pivot pin 25, and the actuation fork is thereby pivotably mounted around the pivot pin. The actuation fork 23 is shown in a perspective view at different angles in FIGS. 2 and 3. Actuation fork 23 has a groove which receives the towel bar 21 so that pivoting of the towel bar urges the actuation fork to pivot about the pivot pin 25. The actuation fork 23 has openings which receive pawls 36, 37, 38, one pawl corresponding to each opening, as shown in FIGS. 4 and 5.

Figure 4:
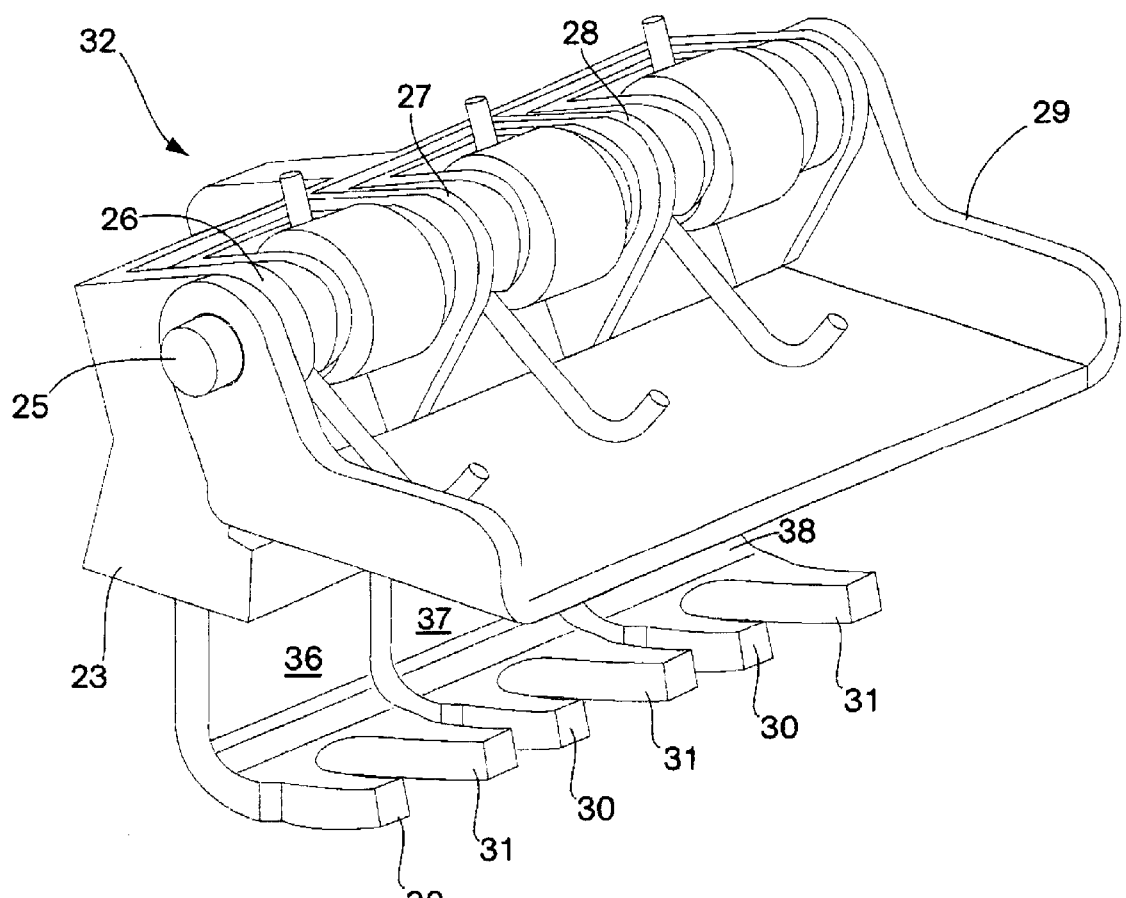
FIG. 4 is an assembled, perspective view of the latch of the preferred embodiment shown with the seat tracks removed for clarity of illustration.
Figure 5:
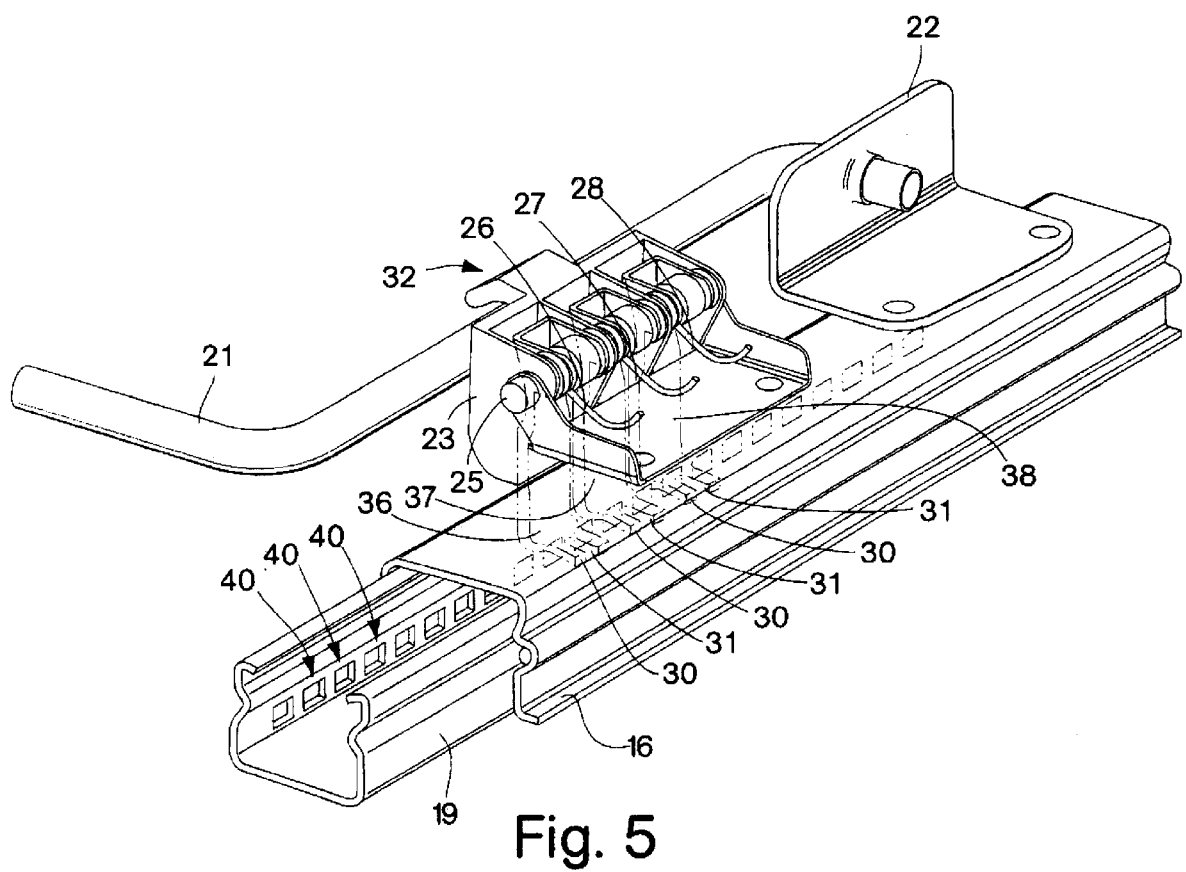
FIG. 5 is a perspective view of the latch of FIG. 4 with the tracks, showing the teeth of the pawls engaging the slots in the lower track.

FIG. 4 shows the latch 32 assembled, with the pawls 36, 37, and 38 pivotably mounted around pivot pin 25 and positioned within the actuation fork 23. The pawls 36, 37 and 38 are individually biased by corresponding springs 26, 27, and 28, respectively so that the latch is biased towards the latching position. Movement of the latch to the unlatching position involves rotation of the actuation fork, which in turn urges the pawls 36, 37, 38 to move against the springs.

In accordance with a highly advantageous feature, each pawl has a pair of teeth, 30, 31. FIG. 5 shows the teeth 30, 31 of the pawls 36 and 37 (but not pawl 38) extending through openings 45 in the upper track 16 and engaging the corresponding slots 40 in the lower track 19. Thus, the latch 32 is in the latching position, and the upper track 16 is restricted from moving with respect to the lower track 19. One tooth corresponds to one slot. That is, preferably two teeth cannot be simultaneously received by one slot. Pawl 38 is not aligned with the slots 40, and is not required for securing the upper track to the lower track. In fact, as discussed below, the size of the teeth and the positioning of the slots is designed so that no more than a pair of the pawls can have their teeth 30, 31 engage the slots of the lower track for any given position of the upper track with respect to the lower track.

Figure 6:
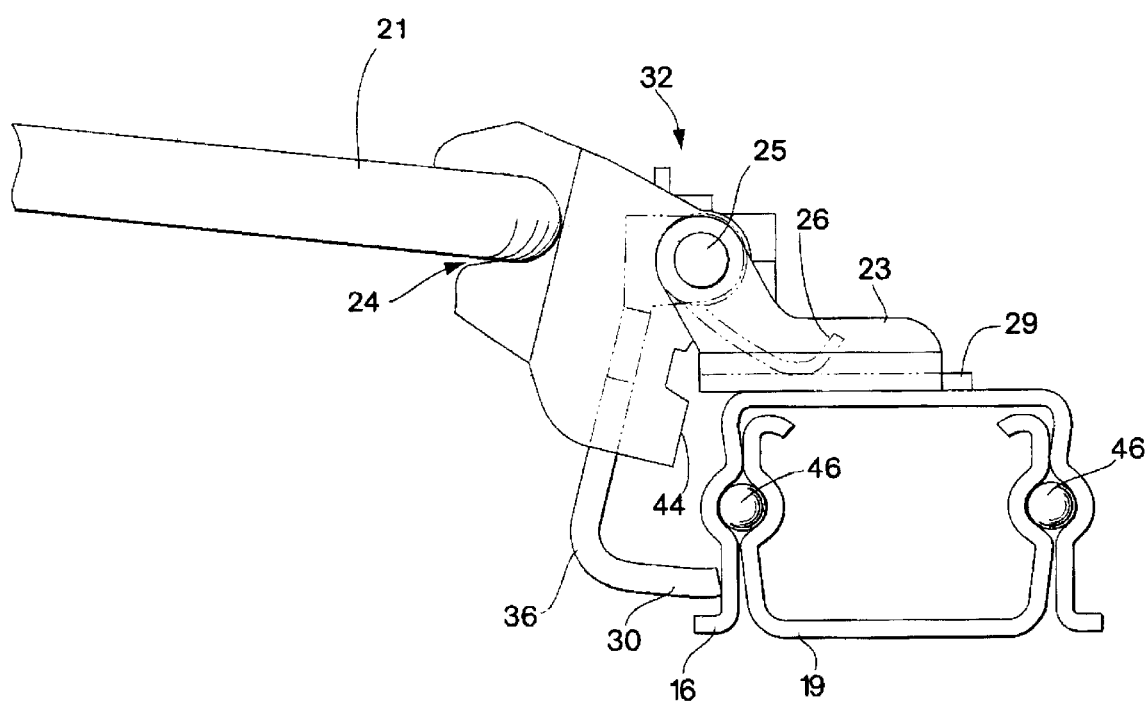
FIG. 6 is an end view of FIG. 5, shown with the latch in the unlatching position where the upper track is free to slide with respect to the lower track.

FIG. 6 shows an end view where the latch 32 has been moved to the unlatching position. The pawls 36, 37, and 38 have been carried by the actuation fork 23 so that all of the teeth 30, 31 of all of the pawls 36, 37, and 38 are now free of the lower track. In this unlatching position, the upper track can slide with respect to the lower track. Bearings 46 may be positioned between the upper and lower tracks to enhance sliding of the upper tracks with respect to the lower tracks when the latches 32 are in the unlatching position.

FIGS. 7 and 8 show a pair of positions of the upper track 16 with respect to the lower track 19 where the teeth 30, 31 of the pawls extend into the slots 40 in the lower track. The first tooth 30 of each pawl has a front face 33 and a rear face 34. Similarly, the second tooth 31 of each pawl has a front face 35 and a rear face 39. The slots 40 each have a front wall 41 and a rear wall 42. In accordance with a highly advantageous feature, the following relationships are preferred between the pawl, the teeth and the slots. The width of the pawl PW, defined as the distance between the front face 33 of the first tooth 30 and the rear face 39 of the rear tooth 31 is about twice the slot width SW; the tooth distance TD, that is, the distance between the rear face 34 of the first tooth 30 on any given pawl and the front face 35 on the second tooth 31 of the same pawl is generally equivalent to the slot width SW; the slots 40 are spaced apart by a slot distance SD equal to one-half the slot width SW; and the pawls are spaced apart by a distance also generally equal to the slot distance SD.

Such a relationship between the pawls and the slots ensures that at least one pawl engages the slots and secures the upper track with respect to the lower track no matter the position of the upper track. For example, in FIG. 7 the first tooth 30 of pawl 36 is shown in a first slot, and the second tooth 31 of pawl 36 is shown in a second slot adjacent the first slot. In this position, however, the second pawl 37 is blocked by the lower track 19 so that its teeth cannot engage the slots. The third pawl 38 is like the first pawl 36 in this position, with its first tooth 30 shown in a slot and its second tooth 31 shown in a second slot. Advantageously, in the position shown in FIG. 7, the front faces 33, 35 of the first and second teeth 30, 31 of pawl 36 resist further motion of the upper track along a first direction by contacting the front walls 41 of a pair of slots 40, and the rear faces 34, 39 of the first and second teeth 30, 31 of pawl 38 resist further motion in a second direction opposite the first direction by contacting the rear walls of a pair of slots. In this manner, a pair of teeth hold the tracks together, significantly increasing the overall loading the tracks can withstand without deforming or disengaging.

FIG. 8 shows the situation where the upper track is moved by a distance equivalent to the slot distance SD. Here, the teeth of the first pawl 36 and the second pawl 37 engage the slots 40, but the third pawl 38 is blocked. Note that in intermediate positions, the upper track can only move by a distance of no more than the slot distance SD before at least one of the teeth encounters one of the walls of a slot. Moreover, at least one pawl always will engage the slots. Thus, the use of multiple pawls each having a pair of teeth as disclosed here ensures positive engagement of the latch. That is, at least one set of teeth of one pawl will always be received by corresponding slots irrespective of the position of the upper track with respect to the lower track.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A seat track assembly comprising, in combination:
   a lower track assembly comprising a lower track having a plurality of spaced slots, with each slot having a front wall and a rear wall;
   an upper track assembly operably engaging the lower track assembly and comprising an upper track slidable over the lower track;
   a latch movable from a latching position securing the upper track with respect to the lower track to an unlatching position where the upper track is free to slide over the lower track, the latch comprising a plurality of locking pawls mounted on the upper track, with each locking pawl having a first tooth and a second tooth and each tooth having a front face and a rear face;
   wherein in the latching position the first tooth of a first one of the locking pawls is received within a first slot of said plurality of spaced slots in the lower track and the second tooth of the first one of the locking pawls is received within a second slot of said plurality of spaced slots in the lower track; and
   wherein each of the locking pawls are movable relative to the other locking pawls if blocked by the lower track to prevent engagement with the slots when the latch is in the latching position.

2. The seat track assembly of claim 1 wherein in the latching position the front face of the first tooth is positioned against the front wall of the first slot, and the front face of the second tooth is positioned against the front wall of the second slot.

3. The seat track assembly of claim 2 further comprising a second one of the locking pawls having a first tooth and a second tooth, wherein in the latching position the first tooth of the second one of the locking pawls is received within a third slot of said plurality of spaced slots in the lower track and the second tooth of the second one of the locking pawls is received within a fourth slot of said plurality of spaced slots in the lower track.

4. The seat track assembly of claim 3 wherein in the latching position the rear face of the first tooth is positioned against the rear wall of the first slot, and the rear face of the second tooth is positioned against the rear wall of the second slot.

5. The seat track assembly of claim 1 further comprising a release member operatively connected to the latch such that movement of the release member moves the latch between latching and unlatching positions.

6. The seat track assembly of claim 5 wherein:
   the lower track assembly comprises a second lower track spaced from and aligned generally parallel to the first lower track;
   the upper track assembly comprises a second upper track slidable over the second lower track; and further comprising
      a second latch movable from a latching position securing the second upper track with respect to the second lower track to an unlatching position where the second upper track is free to slide over the second lower track.

7. The seat track assembly of claim 6 wherein the release member operatively connects the first latch to the second latch so that each latch moves to between latching and unlatching positions substantially simultaneously.

8. A seat track assembly comprising, in combination:
   a lower track assembly comprising a lower track having a plurality of spaced slots, with each slot having a front wall and a rear wall;
   an upper track assembly operably engaging the lower track assembly and comprising an upper track slidable over the lower track;
   a latch movable from a latching position securing the upper track with respect to the lower track to an unlatching position where the upper track is free to slide over the lower track, the latch comprising a plurality of locking pawls mounted on the upper track, with each locking pawl having a first tooth and a second tooth and each tooth having a front face and a rear face;
   wherein in the latching position the first tooth of a first one of the locking pawls is received within a first slot of said plurality of spaced slots in the lower track and the second tooth of the first one of the locking pawls is received within a second slot of said plurality of spaced slots in the lower track;
   a release member operatively connected to the latch such that movement of the release member moves the latch between latching and unlatching positions; and
   an actuation fork pivotably mounted on the upper track, wherein the plurality of locking pawls are seated within the actuation fork, and rotation of the release member urges the actuation fork to pivot which in turn urges the locking pawls to pivot.

9. A seat track assembly comprising, in combination:
   a lower track assembly comprising a lower track having a plurality of spaced slots, with each slot having a front wall and a rear wall;
   an upper track assembly operably engaging the lower track assembly and comprising an upper track slidable over the lower track;
   a latch movable from a latching position securing the upper track with respect to the lower track to an unlatching position where the upper track is free to slide over the lower track, the latch comprising a plurality of locking pawls mounted on the upper track, with each locking pawl having a first tooth and a second tooth and each tooth having a front face and a rear face;

wherein in the latching position the first tooth of a first one of the locking pawls is received within a first slot of said plurality of spaced slots in the lower track and the second tooth of the first one of the locking pawls is received within a second slot of said plurality of spaced slots in the lower track, and a spring corresponding to each pawl biasing the first and second teeth of the corresponding pawl toward the slots in the lower track.

10. The seat track assembly of claim 1 wherein the plurality of locking pawls comprises three pawls, and a maximum of two pawls have teeth which are received within corresponding slots in the lower track when in the latch is in the latching position.

11. The seat track assembly of claim 1 wherein the first slot is adjacent the second slot.

12. A seat track assembly comprising, in combination:

a lower track assembly comprising a lower track having a plurality of slots separated by a slot distance, with each slot having a front wall and a rear wall;

an upper track assembly operably engaging the lower track assembly and comprising an upper track slidable over the lower track;

a latch movable from a latching position securing the upper track with respect to the lower track to an unlatching position where the upper track is free to slide over the lower track, the latch comprising a plurality of locking pawls mounted on the upper track, with each locking pawl having a first tooth and a second tooth and each tooth having a front face and a rear face;

wherein in the latching position the first tooth of a first one of the locking pawls is received within a first slot of said plurality of spaced slots in the lower track and the second tooth of the first one of the locking pawls is received within a second slot of said plurality of spaced slots in the lower track;

wherein in the latching position the front face of the first tooth is positioned against the front wall of the first slot, and the front face of the second tooth is positioned against the front wall of the second slot;

wherein in the latching position the first tooth of a second one of the locking pawls is received within a third slot of said plurality of spaced slots in the lower track and the second tooth of the second one of the locking pawls is received within a fourth slot of said plurality of spaced slots in the lower track; and wherein in the latching position the rear face of the first tooth is positioned against the rear wall of the first slot, and the rear face of the second tooth is positioned against the rear wall of the second slot.

13. A seat track assembly comprising, in combination:

a lower track assembly comprising a lower track having a plurality of slots, each slot having a slot width;

an upper track assembly operably engaging the lower track assembly and comprising an upper track slidable over the lower track; and a latch movable from a latching position securing the upper track with respect to the lower track to an unlatching position where the upper track is free to slide over the lower track, the latch comprising a plurality of locking pawls mounted on the upper track, with each locking pawl having a first tooth and a second tooth, each pawl having a pawl width generally twice the slot width;

wherein in the latching position the first tooth and the second tooth of at least one of the pawls engages corresponding slots in the lower track.

14. The seat track assembly of claim 13 wherein the slots are separated from one another by a distance generally equal to one-half the slot width.

15. The seat track assembly of claim 13 wherein the plurality of locking pawls are separated from one another by a distance generally equal to one-half the slot width.

16. The seat track assembly of claim 13 wherein the first tooth of each locking pawl is separated from the second tooth of the same locking pawl by a distance generally equal to the slot width.

17. The seat track of claim 1 further comprising a release member operatively connected to the latch such that movement of the release member moves the latch between latching and unlatching positions and an actuation fork pivotably mounted on the upper track, and wherein the plurality of locking pawls are seated within the actuation fork and independently movable relative to the actuation fork, and rotation of the release member urges the actuation fork to pivot which in turn urges the locking pawls to pivot.

18. The seat track of claim 1 further comprising a spring corresponding to each pawl and independently biasing the pawls toward the slots in the lower track.

19. The seat track of claim 12 wherein a distance between the pawls is generally equal to a distance between the slots.

20. The seat track of claim 19 wherein each pawl has a width generally twice a width of the slots and wherein the distance between the pawls is generally equal to one-half the width of the slot.

* * * * *